No. 893,914. PATENTED JULY 21, 1908.
G. W. FERGUESON.
SULKY HARROW.
APPLICATION FILED JAN. 10, 1908.

2 SHEETS—SHEET 1.

No. 893,914.  
G. W. FERGUESON.  
SULKY HARROW.  
APPLICATION FILED JAN. 10, 1908.  
PATENTED JULY 21, 1908.  
2 SHEETS—SHEET 2.
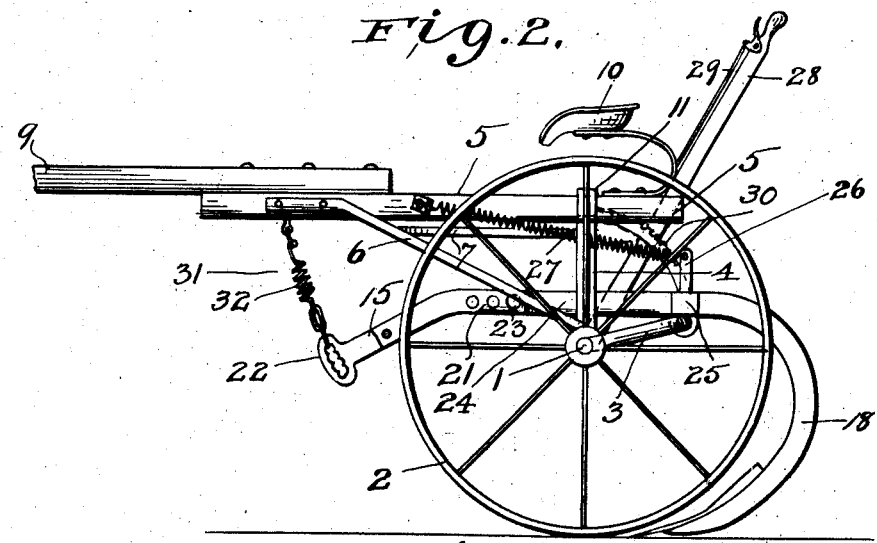
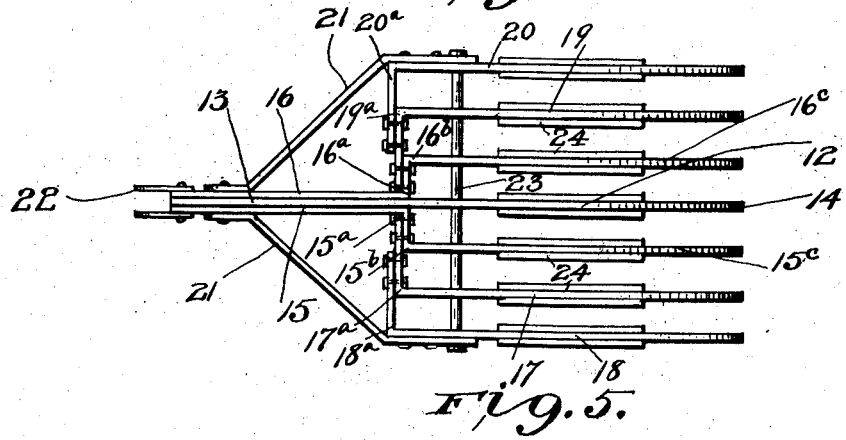
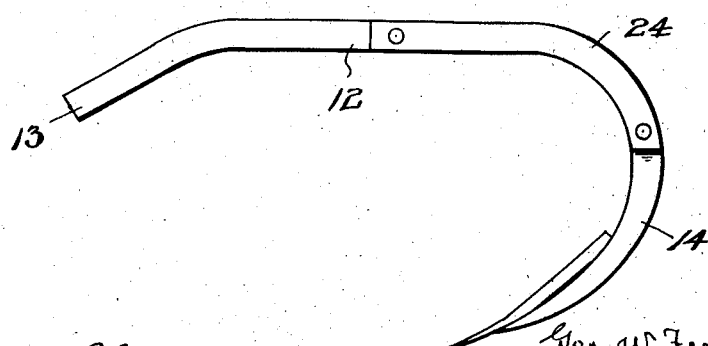

UNITED STATES PATENT OFFICE.

GEORGE W. FERGUESON, OF LOGAN, KANSAS.

SULKY-HARROW.

No. 893,914.  Specification of Letters Patent.  Patented July 21, 1908.

Application filed January 10, 1908. Serial No. 410,175.

*To all whom it may concern:*

Be it known that I, GEORGE W. FERGUE-SON, a citizen of the United States, and a resident of Logan, in the county of Phillips and State of Kansas, have invented certain new and useful Improvements in Sulky-Harrows, of which the following is a full, true, and exact specification.

My invention relates to sulky-harrows, and has for its object the improvement of harrows of the sulky type to the end that the draft is lighter than that of harrows at present constructed and is so arranged that the depth to which the land is cultivated may be instantaneously regulated by the operator to the work in hand, that will operate in the hardest soil, and that is especially adapted to the cultivation of grasses and early spring work on winter wheat.

My invention is also adapted to use in road making in preparing the ground for the grader and scraper.

My invention will be described in detail hereinafter and illustrated in the accompanying drawings, in which—

Figure 1:
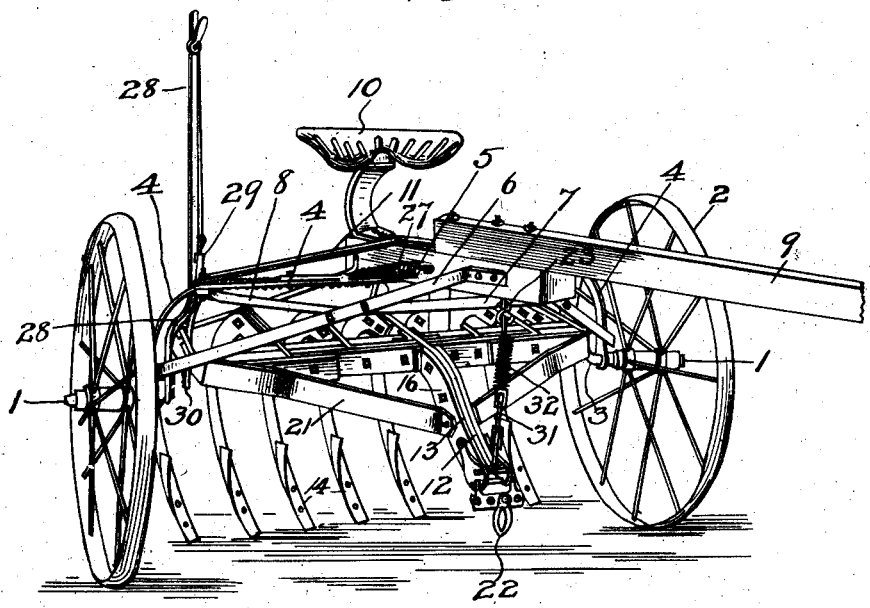
Figure 4:
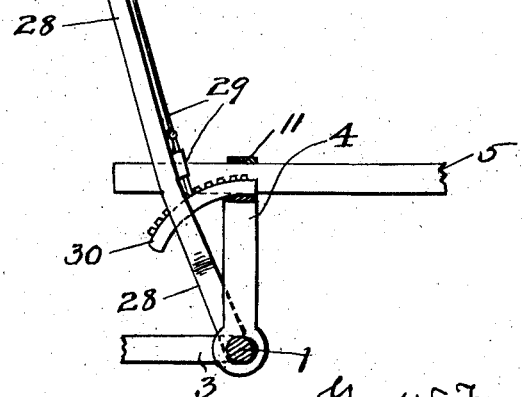

Figure 1 is a front view in perspective of my improved sulky harrow; Fig. 2, a side view; Fig. 3, a plan view of the harrow-frame detached from the draft-frame; Fig. 4, a detail view of the lever for operating the harrow-frame; and Fig. 5, a side view of the central bar.

In the drawings, similar reference characters indicate corresponding parts throughout the several views.

The draft-frame of my improved harrow comprises the axle 1, having the wheels 2, journaled thereon, the axle between the wheels formed with a rearwardly extending crank portion 3, for the purpose hereinafter described, a U-shaped upright frame 4, loosely mounted on the axle 1 at the inside of the hubs of wheels 2, so as to permit the axle 1 turning therein, and a draft-beam 5 mounted on the frame 4, the front end of the draft-beam 5 being connected with the ends of the U-shaped frame 4 by means of rods 6.

7 indicates a rod connecting the horizontal rods 6 together and having its ends extended as shown at 8 and secured to the horizontal portion of U-shaped frame 4.

9 indicates a draft-pole secured to the front of the draft-beam 5 and 10 the operator's seat secured at the rear end of said beam 5.

11 indicates a metal strap secured in its middle on top of draft-beam 5 and at its ends to U-shaped beam 4 to further strengthen the draft-frame.

The sulky harrow frame has a central bar 12 with its front bent downwardly, as shown at 13, forming a goose-neck, and its rear end curved under forming the central tooth 14 of the harrow. On each side of the central bar 12 is another bar 15 and 16, respectively, bent to conform to the goose-neck 13 of said central bar and secured thereto. At the rear end of the goose-neck portion the bar 15 is bent at right angles to bar 12, as shown at 15$^a$, and then bent to the rear and parallel with bar 12, as shown at 15$^b$, and then curved under, as shown at 15$^c$, to form a tooth similar in shape to tooth 14. The bar 16 on the other side of bar 12 is also bent at a right angle thereto, as shown at 16$^a$, then parallel with said bar 12, as shown at 16$^b$, and finally curved under, as shown at 16$^c$, to form a tooth on the other side of tooth 14 from tooth 15$^c$.

17 indicates a tooth similar in shape to the teeth already described and having its forward end bent at substantially a right angle thereto, as shown at 17$^a$, and secured to the part 15$^a$, 18 a tooth similar in shape to tooth 17 with its bent portion 18$^a$ secured to part 17$^a$, 19 a tooth next to tooth 16$^c$ with a part 19$^a$ at substantially right angles to the body thereof and secured to part 16$^a$, and 20 a tooth similar in shape to tooth 19 with its portion 20$^a$ secured to 19$^a$. The seven teeth hereinbefore described constitute the most desirable construction of harrow, but it will be apparent that the number of teeth may be increased indefinitely by repeating the construction shown and described above or may be reduced in number by omitting the teeth not desired, so that I do not confine myself in the construction of my harrow to the specific number of teeth specified, but wish it to be understood that this feature may be altered without affecting the spirit of my invention.

21 indicates a draft-brace secured to the goose-neck portion 13, on each side thereof, and to the outer of the teeth in the harrow-frame above described.

22 indicates a clevis that may be of any construction desired.

23 indicates a bar secured through the upper ends of teeth 14, 15$^c$, 16$^c$, 17, 18, 19 and 20 to further strengthen the harrow-frame, while 24 indicates plates secured on each side of said teeth to the rear of said bar 23 and extending partway down the curved portion thereof to strengthen the teeth at the points where bent downwardly. The harrow-frame is mounted on the crank portion 3 of shaft 1 by means of brackets 25 secured to the outside teeth of the frame.

26 indicates an arm secured to the middle tooth bar 12 and 27 a coil-spring connecting draft-beam 5 and arm 26 to normally hold the harrow frame in a raised position, so that the teeth do not engage the earth.

28 indicates a lever secured to one side of axle 1 to raise and lower the harrow-frame and having a spring-actuated catch 29 mounted thereon to engage the teeth of segmental rack 30 secured to U-shaped frame 4.

31 indicates a flexible connection secured at one end to clevis 22 and at the other to the underside of draft-beam 5 to limit the movement of the harrow-frame when being lifted from an operative position by the action of spring 27 and lever 28, 32 indicating a coil-spring secured intermediate of the ends of said chain to ease the movement of the harrow-frame and take up the jar.

Having thus described my invention, what I claim is—

1. In a sulky-harrow, the harrow-frame consisting of a plurality of tooth bars having their ends overlapping one another and secured together, substantially as shown and described.

2. In a sulky-harrow, the harrow-frame consisting of a plurality of tooth-bars having their ends overlapping one another and rigidly secured together, substantially as shown and described.

3. In a sulky-harrow, the harrow-frame consisting of a plurality of tooth-bars, the middle bar formed with a gooseneck at its front end, the bars at each side of said middle bar having their front ends conforming to the shape of the middle bar and secured thereto and formed with an angular offset to space the rear ends from the rear end of the middle bar, the tooth bars at each side of the last mentioned tooth-bars formed with angular portions secured to said angular offsets, and other tooth-bars having angular portions secured to the angular portions of the adjacent tooth-bars, substantially as shown and described.

4. In a sulky-harrow, the axle formed with a crank portion, the draft frame pivotally secured to the axle, the harrow-frame pivotally secured to the crank portion of the axle, a coil-spring connecting the harrow-frame and the draft-frame, a lever secured to the crank portion of the axle and having a spring catch mounted thereon, and a segmental rack secured to the draft-frame to engage the catch on the lever, substantially as shown and described.

5. In a sulky-harrow, the axle formed with a crank portion, the draft-frame pivotally secured to the axle, the harrow-frame pivotally secured to the crank portion of the axle, said harrow-frame consisting of a plurality of tooth-bars having their ends overlapping one another and secured together, a coil-spring connecting the harrow-frame and the draft-frame, a lever secured to the crank portion of the axle and having a spring-catch mounted thereon, and a segmental rack secured to the draft-frame to engage the catch on the lever, substantially as shown and described.

6. In a sulky-harrow, the axle formed with a crank portion, the draft-frame pivotally secured to the axle, the harrow-frame pivotally secured to the crank portion of the axle, said harrow-frame consisting of a plurality of tooth-bars having their ends overlapping one another and rigidly secured together, a coil-spring connecting the harrow-frame and the draft-frame, a lever secured to the crank portion of the axle and having a spring-catch mounted thereon, and a segmental rack secured to the draft-frame to engage the catch on the lever, substantially as shown and described.

7. In a sulky-harrow, the axle formed with a crank portion, the draft-frame pivotally secured to the axle, the harrow-frame pivotally secured to the crank portion of the axle, said harrow-frame consisting of a plurality of tooth-bars, the middle bar formed with a gooseneck at its front end, the bars at each side of said middle bar having their front ends conforming to the shape of the middle bar and secured thereto and formed with an angular offset to space the rear ends from the rear end of the middle bar, the tooth-bars at each side of the last-mentioned tooth-bars formed with angular portions secured to said angular offsets, and other tooth-bars having angular portions secured to the angular portions of the adjacent tooth-bars, a coil-spring connecting the harrow-frame and the draft-frame, a lever secured to the crank portion of the axle and having a spring-catch mounted thereon, and a segmental rack secured to the draft-frame to engage the catch on the lever, substantially as shown and described.

In witness whereof, I have hereunto set my hand in presence of two subscribing witnesses.

GEORGE W. FERGUESON.

Witnesses:
PEARL MATHEWS,
M. S. MATHEWS.